R. T. MURRAY AND J. W. TASKER.
FLUTING MACHINE.
APPLICATION FILED APR. 21, 1921.
1,433,025.
Patented Oct. 24, 1922.
7 SHEETS—SHEET 1.
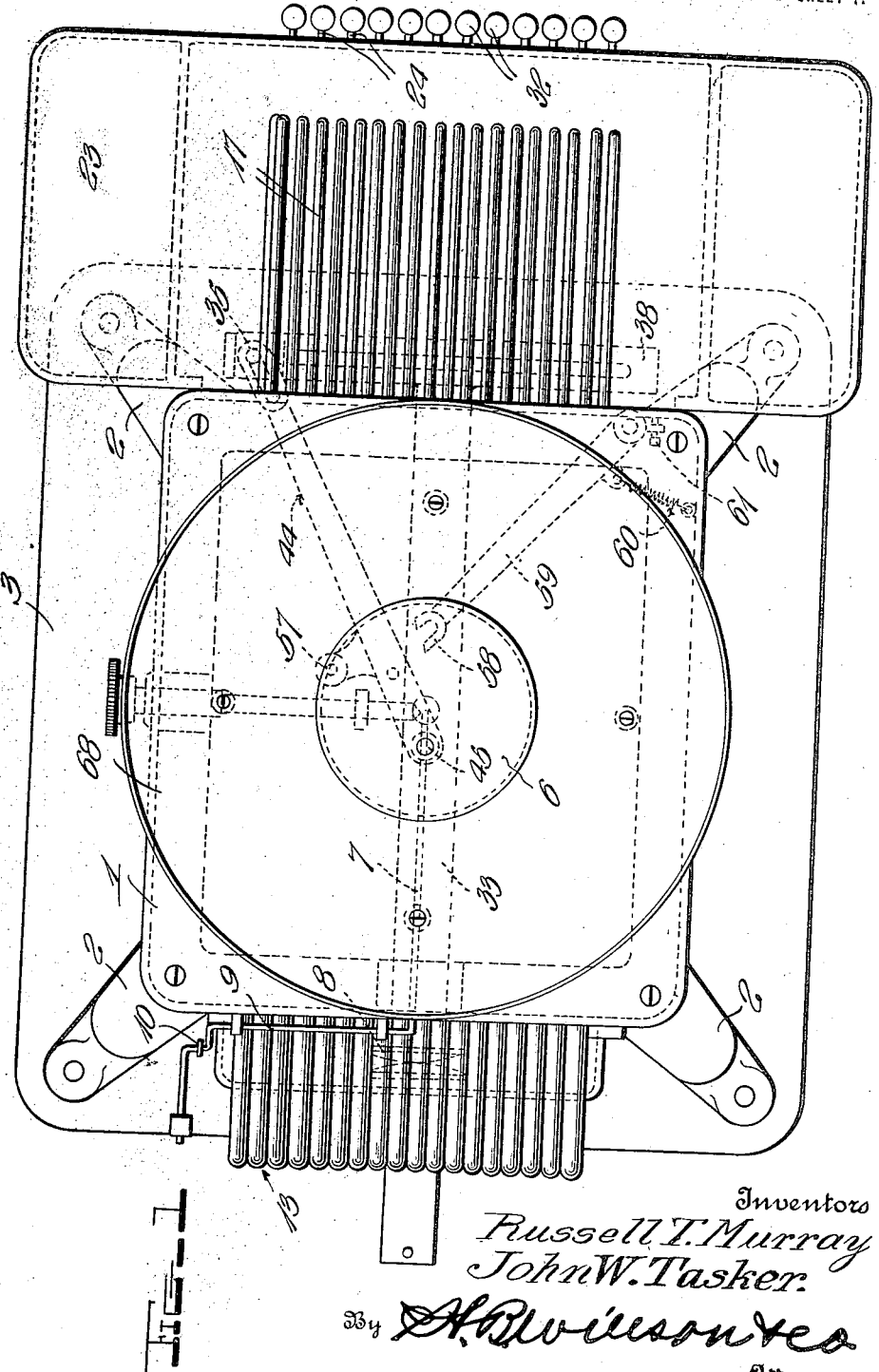
Inventors
Russell T. Murray
John W. Tasker
By H. B. Willson & Co.
Attorneys R. T. MURRAY AND J. W. TASKER.
FLUTING MACHINE.
APPLICATION FILED APR. 21, 1921.
1,433,025.
Patented Oct. 24, 1922.
7 SHEETS—SHEET 2.
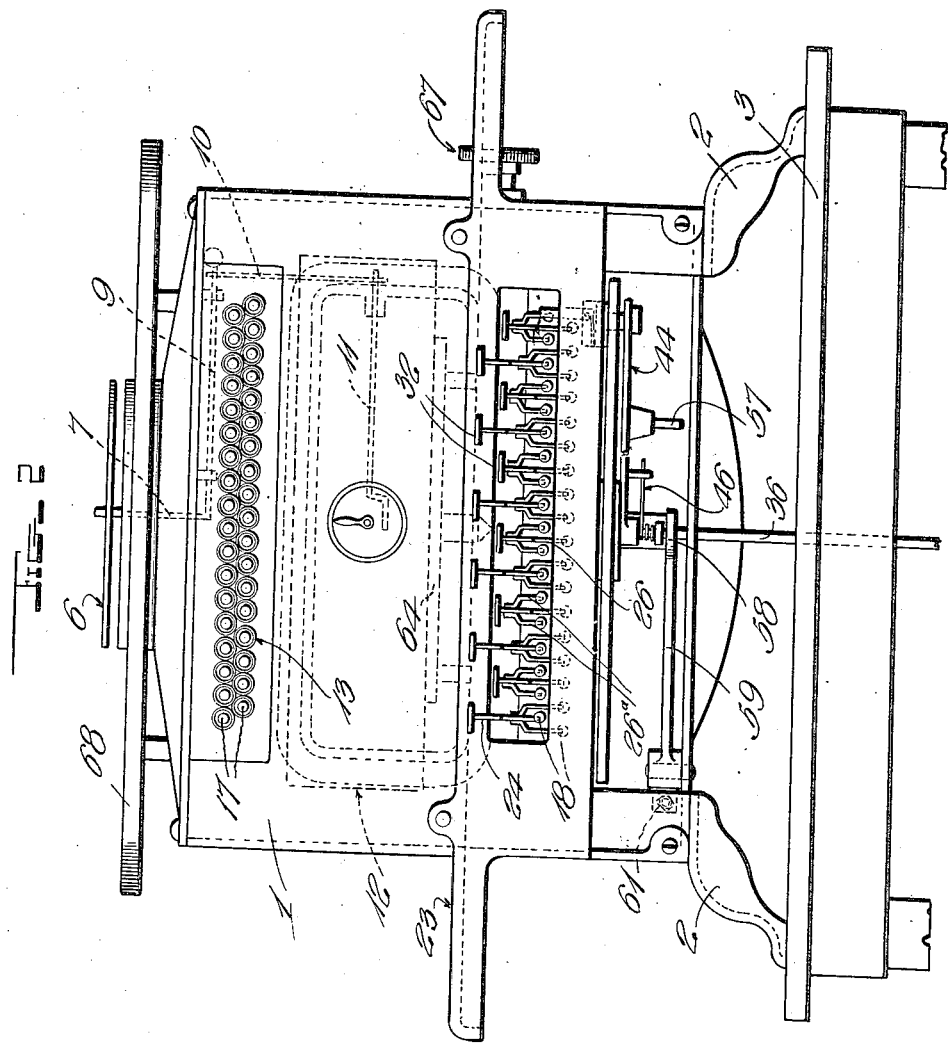
Inventors
Russell T. Murray
John W. Tasker
By H. B. Wilson & Co.
Attorneys

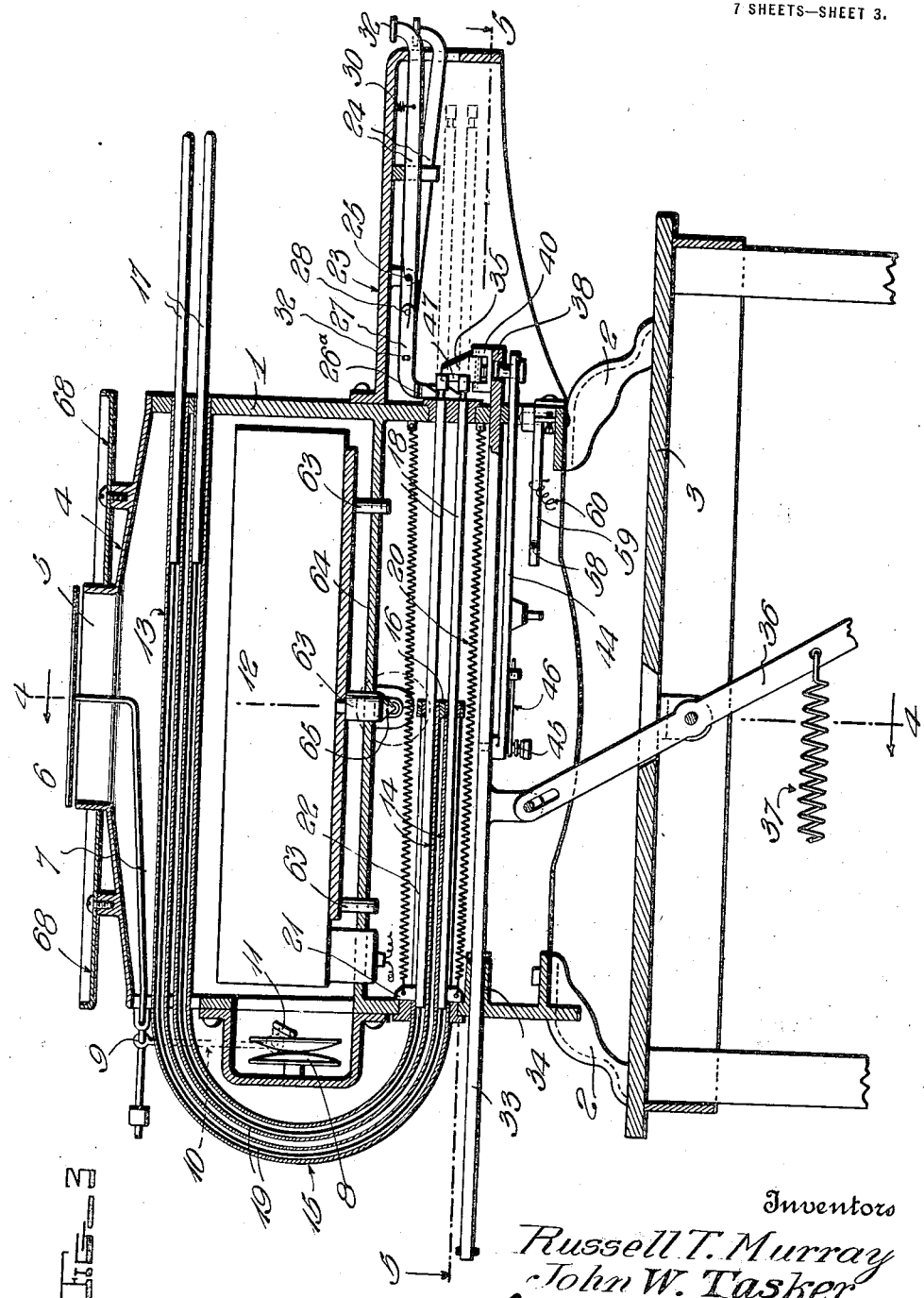

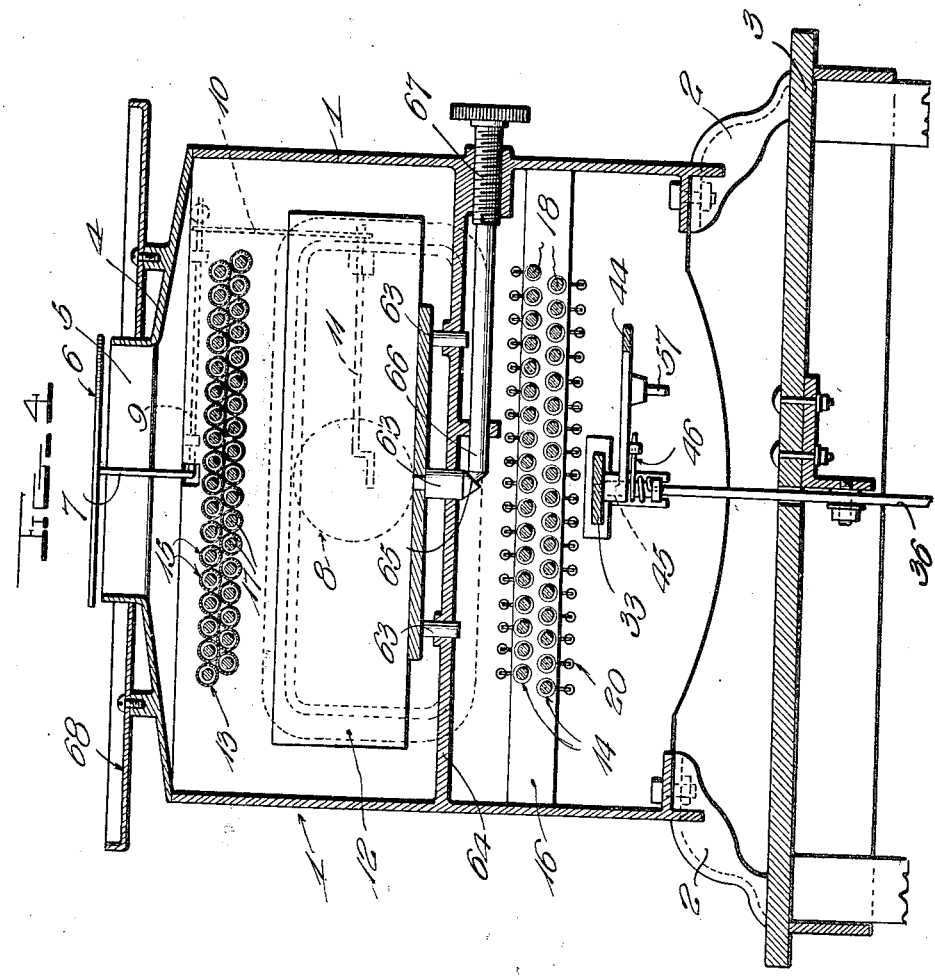

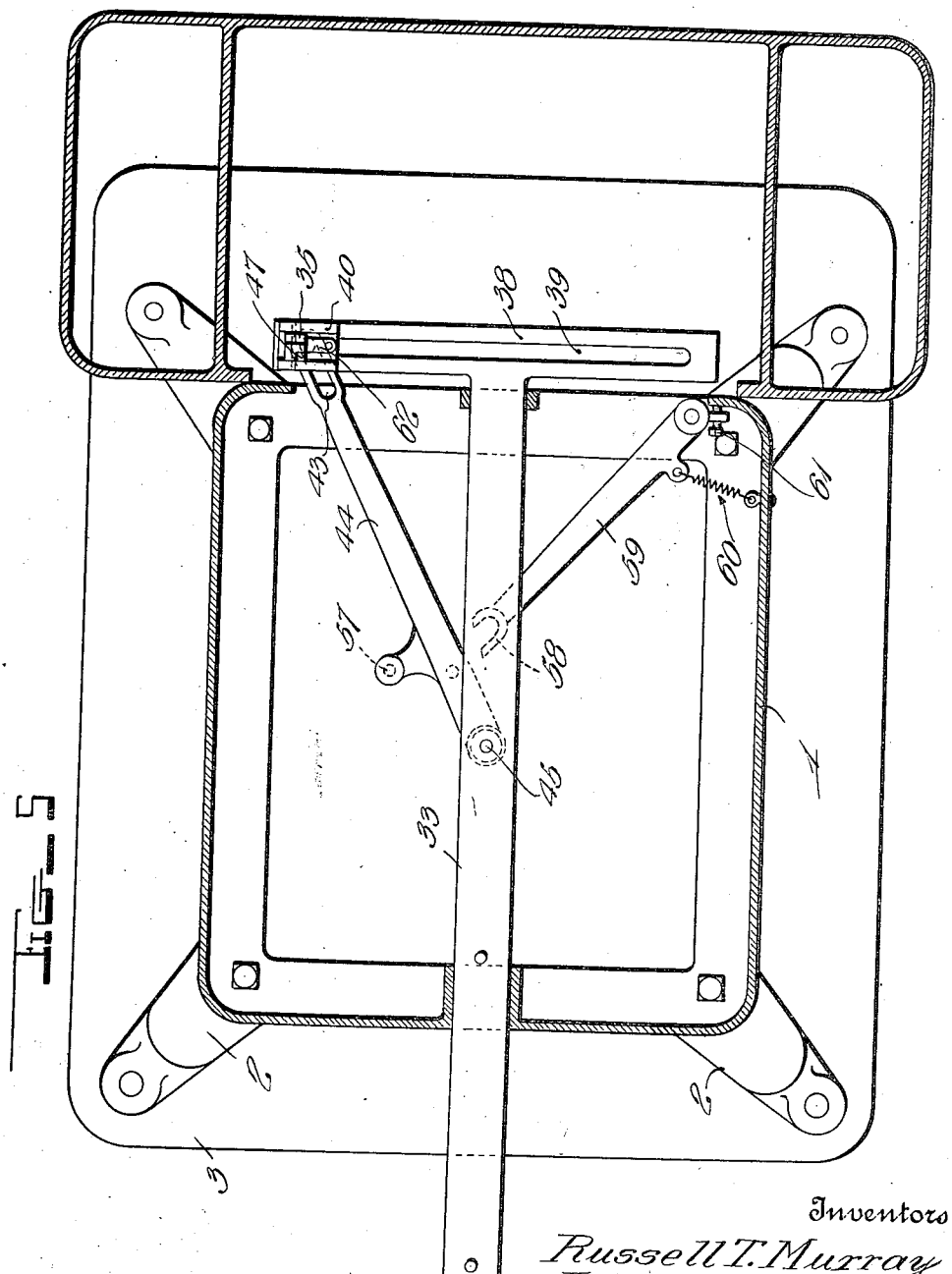

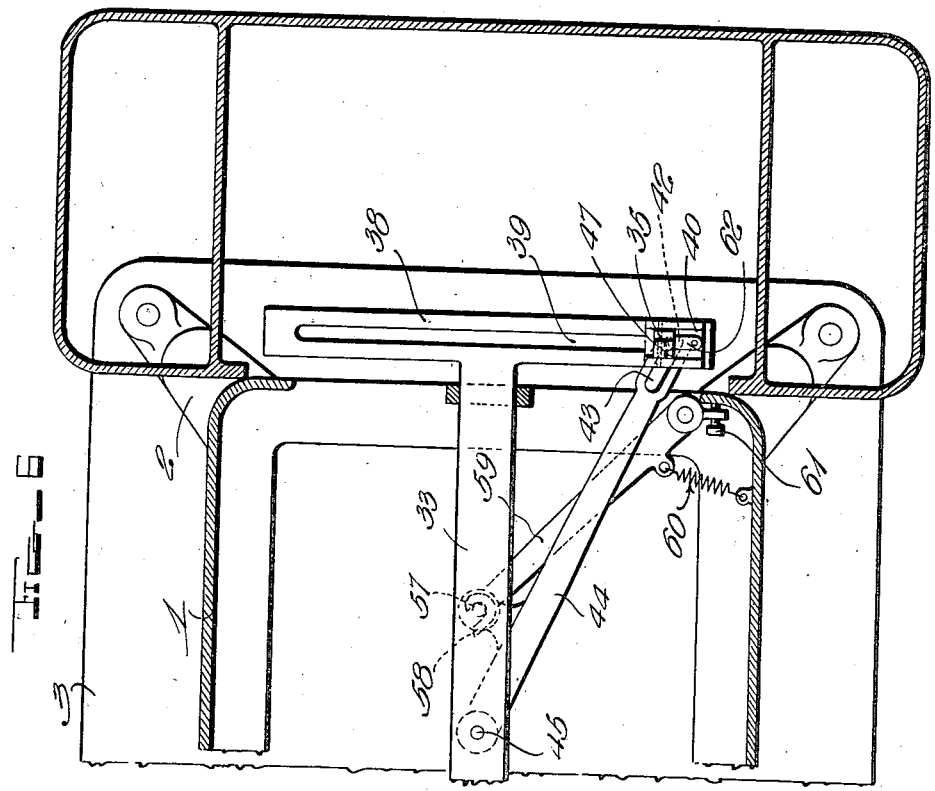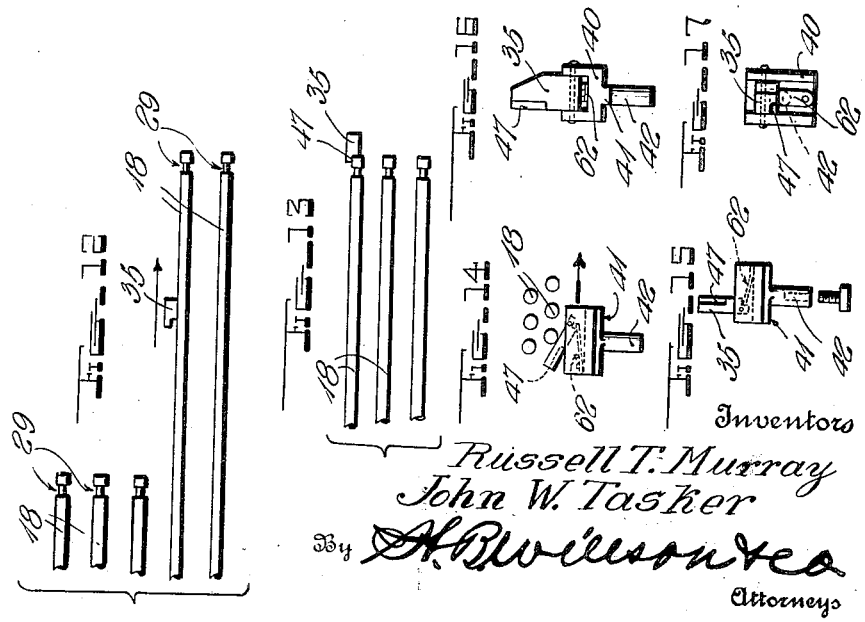

R. T. MURRAY AND J. W. TASKER.
FLUTING MACHINE.
APPLICATION FILED APR. 21, 1921.
1,433,025.
Patented Oct. 24, 1922.
7 SHEETS—SHEET 7.
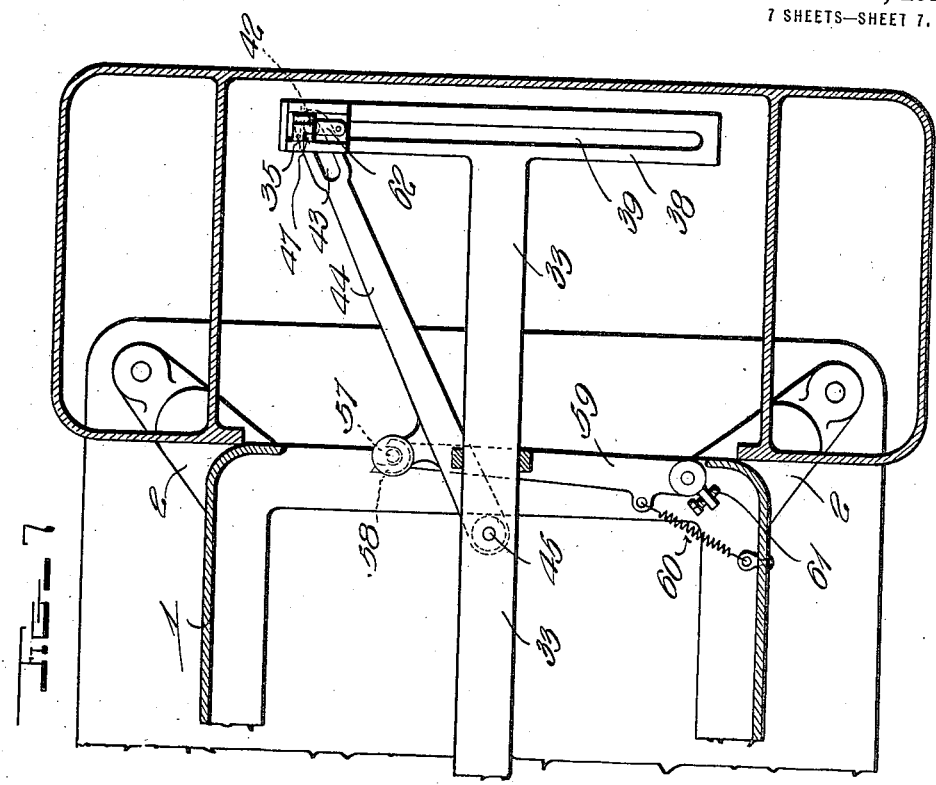
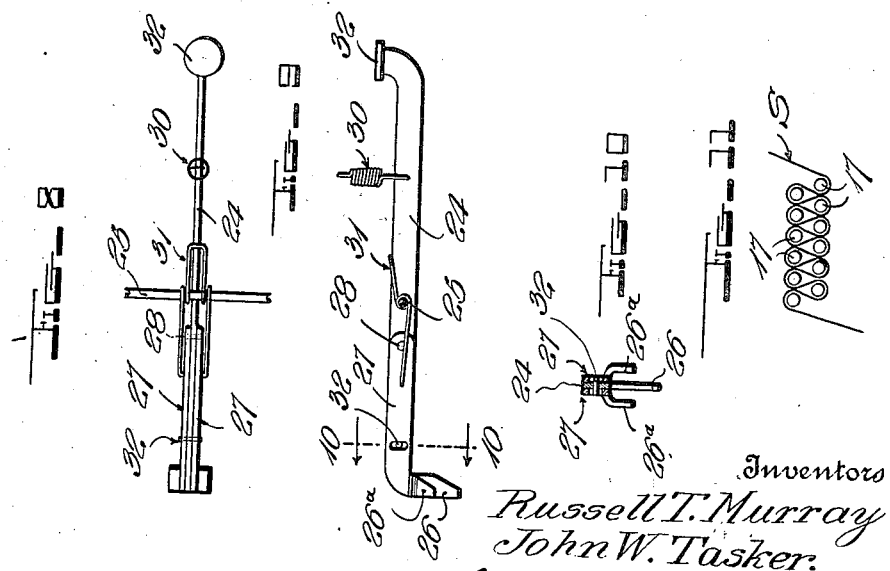
Inventors
Russell T. Murray
John W. Tasker
By H. B. Wilson & Co
Attorneys Patented Oct. 24, 1922.

1,433,025

UNITED STATES PATENT OFFICE.

RUSSELL T. MURRAY, OF LAPORTE, AND JOHN WILEY TASKER, OF MICHIGAN CITY, INDIANA; SAID MURRAY ASSIGNOR TO SAID TASKER.

FLUTING MACHINE.

Application filed April 21, 1921. Serial No. 463,274.

*To all whom it may concern:*

Be it known that we, RUSSELL T. MURRAY and JOHN WILEY TASKER, citizens of the United States, residing at Laporte and Michigan City, respectively, in the county of Laporte and State of Indiana, have invented certain new and useful Improvements in Fluting Machines; and we do declare the following to be a full, clear, and exact description of the invention, such as will enable others skilled in the art to which it appertains to make and use the same.

Our invention relates to improvements in devices for fluting numerous kinds of material, the present invention being so designed that it operates to great advantage for fluting the starched material used extensively in the manufacture of religious bonnets and the like, although it is to be understood that the invention is in no sense restricted to this use.

One object of our invention is to provide a fluting machine having a plurality of normally retracted fluting irons which may be projected for use as required, novel provision being made for heating said irons while they are retracted and for again retracting said irons after they have accomplished their functions.

Other objects are to provide a novel arrangement of fluting irons; to make unique provision for guiding and operating said irons; to provide a novel dog and actuating mechanism therefor, for the purpose of projecting the fluting irons successively; to provide for returning this dog to starting position after the last iron has been projected; to provide a plurality of key-controlled latches for holding the fluting irons in projecting positions; to provide novel means for retracting the fluting irons when the latches are released; to devise a unique mechanism for adjusting the heater toward and from the fluting irons as required; and to make novel provision for permitting some heat to escape from the heating casing whenever the temperature rises above a predetermined degree.

With the foregoing and minor objects in view, the invention resides in the novel construction, combination and arrangement of parts hereinafter described and claimed, the descriptive matter being supplemented by the accompanying drawings.

Figure 1 is a top plan view of a fluting machine constructed in accordance with our invention.

Figure 2 is an end elevation looking toward the fluting irons and the key board for controlling the latches which hold said irons in projecting positions.

Figure 3 is substantially a central, vertical, longitudinal sectional view, some of the fluting irons being projected and others retracted.

Figure 4 is a vertical transverse sectional view as indicated by line 4—4 of Fig. 3.

Figure 5 is a horizontal sectional view substantially on line 5—5 of Fig. 3, showing the relation of parts when the dog for projecting the fluting irons is at starting position.

Figure 6 is a fragmentary view similar to Fig. 5 but showing the relation of parts when the dog has moved on its last operating stroke.

Figure 7 is a duplicate of Fig. 6 with the exception that it illustrates the manner in which the dog is returned to starting position.

Figures 8 and 9 are respectively a top plan and side elevation of one of the key controlled latch units.

Figure 10 is a detail transverse section as indicated by line 10—10 of Fig. 9.

Figure 11 is a diagram showing the manner of passing the material to be fluted, around the fluting irons.

Figures 12 and 13 are diagrammatic plan views illustrating the operation of the dog which projects the fluting irons.

Figure 14 is a detail side elevation of the dog and its carrier showing the manner in which said dog swings inwardly while returning across the set of iron-operating rods which is actuates.

Figure 15 is an elevation looking in the opposite direction from Fig. 14 and showing the dog in its normally upright position.

Figure 16 is an end elevation of the dog carrier, the dog being shown in its normal position.

Figure 17 is a top plan view of the dog and dog carrier.

In the drawings above briefly described, we have shown a preferred form of construction and in the following, such construction is described in detail. It is to be understood however that the present disclosure is for illustrative purposes only and that the details set forth need not necessarily be followed, should other equivalent arrangements be found more desirable.

The numeral 1 designates a rectangular casing supported by legs 2 from a suitable table or the like 3, the top 4 of said casing being provided with a hot-air outlet 5 controlled by a damper 6 on a counter-balanced arm 7 controlled by a thermostat 8 through the medium of any suitable operating connections. Arm 7 is preferably fixed on a rock shaft 9 carried by the casing and this rock shaft is provided with a depending crank arm 10 which is operated from the thermostat 8 through the medium of an appropriate crank shaft or the like 11. An electric or other heater 12 is located in the the casing 1 and the thermostatic damper 6 either permits or prevents the escape of heat from said casing, according to the temperature in the latter.

As shown most clearly in Figs. 3 and 4, the heater 12 is horizontally elongated and is positioned between the upper and lower reaches 13 and 14 respectively of a plurality of U-shaped tubes 15, the upper reaches of said tubes extending entirely across the casing while the lower reaches 14 are shown extending only about half way across said casing, with their inner ends secured in spaced relation by a transverse bar 16. The tubes 15 carry, in their upper reaches 13, a plurality of rod-like fluting irons 17 and said reaches are so related that these irons are disposed in two vertically spaced rows, the irons of the upper row being disposed in staggered relation with respect to those of the other row as shown clearly in Figs. 2, 4 and 11. The lower reaches 14 are related in the same staggered manner as the upper reaches, and said lower reaches carry horizontal operating rods 18 for the fluting irons 17, said rods and irons being connected by means of wires 19 located in the tubes 15 as clearly shown in Fig. 3. It thus follows that when the rods 18 are projected from the casing 1, the fluting irons 17 are retracted, whereas forcing said rods into the casing projects the irons for use. For moving the rods 18 in a manner to retract the irons 17, we employ a plurality of coil springs 20 secured at one end to the casing while their other ends are connected with lugs 21 on the rods 18, said lugs extending outwardly through slots 22 in the reaches 14.

For holding the rods in iron-projecting position against the tension of the springs 20, an arrangement of latches is provided, said latches being preferably mounted on and positioned under an apron 23 which extends forwardly from the casing 1 under the fluting irons 17. The details of the latches are shown most clearly in Figs. 3, 8, 9 and 10. A plurality of main latch levers 24 are fulcrumed on a horizontal rod 25 and disposed in parallel relation with each other, the inner ends of said levers being turned downwardly to provide noses 26. Supplemental latches 27 are pivoted at 28 on opposite sides of the levers 24 and have their inner ends turned downwardly to form other noses 26a disposed on opposite sides of and spaced from the noses 26. The several noses 26 and 26a are adapted to seat in notches 29 in the rods 18 as shown clearly in Fig. 3, springs 30 being employed for moving the levers 24 to active position, while other springs 31 are used to move the latches 27 into engagement with their respective notches 29, independently of any movement on the part of the levers 24. The latches 27 and levers 24 however are connected with each other by means of a suitable pin and slot connection 32 so that whenever lever 24 is operated to release its respective nose 26 from one of the rods 18, the two adjacent latches 27 will be simultaneously moved to retract their noses 26a and release the two rods which they have previously been holding. Thus, although each lever 24 and the latches 27 carried thereby are independently movable to operative position so as to hold the fluting irons 17 when they are projected one at a time, these three latch members are simultaneously releasable so that the springs 20 may act to simultaneously return three of the fluting irons to their retracted positions within the casing 1. This is of advantage for several reasons, the most important of which is that it simplifies the operation of the machine and reduces the number of keys or finger-pieces which are used for releasing the latches, such keys or finger-pieces being located on the outer ends of the latch levers 24, as indicated by the reference numeral 32.

The mechanism for shifting the rods 18 inwardly and thereby projecting the fluting irons 17 for use, includes a horizontal carriage bar 33 which extends across the casing 1 below said rods, being suitably guided by passage through openings 34 in the casing wall. The front end of the bar 33 carries a dog 35 for successively engaging the rods 18 when the latter are projected to the position shown in dotted lines by Fig. 3 and shifting said rods inwardly to the full line position of this figure, so as to project the fluting irons 17. For moving the rod 33 forwardly and rearwardly to operate the dog 35 in the manner set forth, any preferred means may of course be employed, but we prefer to use a foot lever 36 for forcing said bar rearwardly and a coil spring 37 for pulling said lever in such a manner as to move the bar 33 forwardly. Thus, every time the foot lever 36 is operated, bar 33 is shifted rearwardly and dog 35 forces one of the rods 18 into the casing 1, thereby simultaneously projecting the fluting iron 17 which is connected with said rod. When the foot lever 36 is released, the spring 37 returns the bar 33 to its forward position and the dog 35 then engages the outer end of the next rod 18, in readiness for shifting said rod to project the next fluting iron at the required moment.

Although numerous arrangements might be employed for mounting the dog 35, the construction shown is preferable, this construction being illustrated most clearly by Figs. 5, 6, 7 and 14 to 17. The front end of bar 33 is provided with a T-head 38 having a longitudinal slot 39 or other guideway for a dog carrier 40 which is preferably of the channeled form shown, the bottom of said carrier being provided with a rib 41 received in the slot 39 to prevent rotation of said carrier about a stud 42 which depends therefrom through the slot, this stud being slidably received in a slot 43 in a dog shifting arm 44 which is pivoted at 45 to bar 33. A spring 46 acts on the arm 44 to constantly exert a tendency to move said arm from the position shown in Fig. 1 to that disclosed in Fig. 6. It thus follows that after the dog 35 has shifted one rod 18 into the casing and releases said rod, the arm 44 moves said dog and its carrier 40 inwardly so that the dog slides back along the next adjacent rod 18 when the spring 37 returns the bar 33, this operation being indicated in diagram in Fig. 12. Furthermore, when the dog 35 has reached the limit of its return movement, the spring-moved arm 44 acts to further shift said dog laterally so that its rod-engaging notch 47 will be properly engaged with the next rod to be shifted as shown in Fig. 13.

After the last rod 18 has been moved inwardly into the casing, and the bar 33 starts to return toward the front of the machine, the dog 35 disengages the rod last shifted and permits the spring 46 to throw the arm 44 laterally to the limit allowed. This serves to seat a pin or other projection 57 carried by the arm 44, in the forked end 58 of a pivoted resetting arm 59. Previous to this, the arm 59 has been held in the position shown in Fig. 5, by means of a coil spring 60 and stop screw 61 and said arm is unmolested until the arm 44 has moved from the position shown in Fig. 5 to that depicted in Fig. 6. As above stated however, when this relation of parts is reached, the pin 57 and fork 58 are interengaged as clearly shown in Fig. 6, the result being that as bar 33 and associated parts complete their movement toward the front of the machine, the arm 59 swings to the position shown in Fig. 7 thereby returning the arm 44 and the dog carrier 40 to starting position. In the meantime, a number of the first irons 17 which were projected, have been returned into the casing 1 and the rods 29 correspondingly projected and in order that the dog 35 may pass under these projected rods, we pivotally mount said dog for downward swinging as indicated in Fig. 14, a suitable spring 62 being employed however for righting said dog and holding it in upright position after it has passed the rods. The dog is pivotally mounted in the channel of the carrier 40 and the spring 62 is secured in said channel as shown.

Preferably used in conjunction with the features above described, is a mechanism for adjusting the heater 12 toward and from the upper reaches of the tubes 15, so as to direct more or less heat upon the retracted fluting irons 17. This is preferably accomplished by providing the heater with several depending projections 63 (Figs. 3 and 4) which are slidably received in a horizontal partition 64 with which the casing 1 is provided, one of said projections having a cam surface 65 on its lower end co-operable with the tapered end 66 of a set-screw 67 so that by adjusting said screw, the heater 12 may be raised or lowered as required.

In operation, all of the fluting irons 17 are retracted into the casing 1 so as to be heated by the electric or other heater 12. When the proper temperature has been attained, the first iron 17 is projected by pushing upon the foot lever 36. The strip S of starched or other material to be fluted is looped around this iron, the next iron is then projected, the strip is looped around the same, and so on until the required length of fluting is produced as will be clear by reference to Fig. 11. Before the entire fluting operation is completed, the irons 17 which were first projected, have entirely dried the strip S and if left longer in contact therewith, would scorch the same. Therefore, these irons are returned into the casing simply by pressing the keys 32 and releasing the rods 18 so that the springs 20 may act. As the strips of fluting are completed, they may well be laid in a pan 68 carried by the top of the casing 1 so that any portions thereof not completely dried by the irons 17 will be subjected to a further drying operation.

Although understandable from the above specific description, it may be well to set forth that the moment the foot lever 36 is released, the spring 37 returns the bar 33 from the position shown in Fig. 3 to its foremost position, at which time, the spring 36 acts upon the arm 54 so that the dog 35 is shifted laterally into engagement with the next rod 18 as shown in diagram in Fig. 13. When the foot lever is again operated, the last named rod is forced into the casing and is held by one of the latches 24—27, the result being that the iron 17 connected with the rod is projected for use and held in this projected position. During each return movement, the dog 35 slides along one of the rods 18 as depicted in Fig. 12, but as soon as it reaches the outer end of this rod, it engages the same as shown in Fig. 13 so that it is in readiness to inwardly shift the rod when required. In order to retract any of the irons 17, it is merely necessary to operate the keys 32 thereof, whereupon the springs 20 immediately come into play.

When the last rod 18 has been inwardly shifted and the bar 33 and associated parts return toward the front of the machine, the pin 57 and fork 58 interengage as shown in Fig. 6 and the resetting arm 59 swings from the position disclosed in this figure to that illustrated in Fig. 7, thereby forcing the arm 44 laterally against the tension of its operating spring 46, positioning the dog 35 at the starting point. When this dog encounters any of the rods 18 which have been returned to their projected positions, it merely yields downwardly as disclosed in Fig. 14 and passes under said rods, being eventually returned to upright position by the spring 62.

Since excellent results may be obtained from the several features of construction shown and described, such features may be followed if desired, but as above suggested, it is possible, within the scope of the invention as claimed, to make numerous changes.

We claim:

1. A fluting machine comprising a plurality of normally retracted fluting irons, means for heating said irons, and means for projecting said irons for use.

2. A fluting machine comprising a plurality of normally retracted fluting irons, means for heating said irons, means for projecting said irons one at a time for use, and means for returning a plurality of said irons at a time.

3. A fluting machine comprising two rows of normally retracted fluting irons movable on parallel lines, the irons of one row being in staggered relation with those of the other row, means for heating said irons, and means for projecting first an iron from one row and then the next iron of the other row.

4. A fluting machine comprising a casing, a plurality of fluting irons mounted to move into and to project beyond said casing, means in said casing for heating end fluting irons, and means for projecting and retracting said fluting irons.

5. A fluting machine comprising a casing, a heater in said casing, a plurality of fluting irons in said casing over said heater, said casing having openings through which said irons may be projected for use, and means below said heater for projecting and retracting said irons.

6. A fluting machine comprising a casing, a heater in said casing, a plurality of horizontal tubes across said casing adjacent said heater, fluting irons slidable in said tubes and projectable beyond the casing for use, wires in said tubes connected to said fluting irons, and means for operating said wires to project and retract said fluting irons.

7. A fluting machine comprising a casing, a heater in said casing, U-shaped tubes having their arms disposed above and below said heater, fluting irons slidable in the upper arms of said tubes and projectable beyond the casing for use, rods slidable in the lower arms of said tubes, wires in said tubes connecting said irons and rods, and means for operating said rods to project and retract said irons.

8. A fluting machine comprising projectable and retractable fluting irons, operating rods connected with said irons and slidably mounted for movement on substantially parallel lines, means for successively sliding said rods in one direction to project the aforesaid fluting irons, latches for holding said rods after so moving them, and means for returning said rods when their respective latches are released, whereby to retract the fluting irons.

9. A fluting machine comprising projectable and retractable fluting irons, operating rods connected with said irons and slidably mounted for movement on substantially parallel lines, foot-operated means for successively sliding said rods in one direction to project the aforesaid fluting irons, hand-released latches for holding said rods after so moving them, and means for returning said rods when their respective latches are released, whereby to retract the fluting irons.

10. A fluting machine comprising projectable and retractable fluting irons, operating rods connected with said irons and slidably mounted for movement on substantially parallel lines, a rod-shifting dog, carrying means for said dog operable to move the same to successively shift said rods to iron-projecting position, latches for holding said rods when so shifted, and means for returning said rods when said latches are released.

11. A fluting machine comprising projectable and retractable fluting irons, operating rods connected with said irons and slidably mounted for movement on substantially parallel lines, a rod-shifting dog, carrying means for said dog operable to shift said rods one at a time to iron-projecting position, means for moving said dog laterally into engagement with the next rod after disengagement from the rod previously shifted, latches for holding said rods when released by said dog, and means for returning said rods when said latches are released.

12. A fluting machine comprising projectable and retractable fluting irons, operating rods connected with said irons and slidably mounted for movement on substantially parallel lines, a carriage mounted adjacent said rods for movement parallel therewith, means for moving said carriage, said carriage having a guideway transverse to said rods, a dog carrier movable along said guideway, means exerting a constant stress on said carrier to move it toward one end of said guideway, a dog on said carrier for successively shifting said rods to iron-projecting position, when the carriage is operated, latches for holding said rods when so shifted, and means for returning said rods when their respective latches are released.

13. A fluting machine comprising projectable and retractable fluting irons, operating rods connected with said irons and slidably mounted for movement on substantially parallel lines, a carriage mounted adjacent said rods for movement parallel therewith, means for moving said carriage, said carriage having a guideway transverse to said rods, a dog carrier movable along said guideway, a spring-moved arm pivoted to said carriage and connected to said dog carrier to exert a constant stress to move said carrier toward one end of the guideway, a dog on said dog carrier for successively shifting said rods to iron-projecting position when the carriage is operated, latches for holding said rods when so shifted, and means for returning said rods when their respective latches are released.

14. A fluting machine comprising projectable and retractable fluting irons, operating rods connected with said irons and slidably mounted for movement on substantially parallel lines, a rod-shifting dog, carrying means for said dog operable to shift said rods one at a time to iron-projecting position, means for moving said dog laterally into engagement with the next rod after disengagement from the rod previously shifted, means for returning said dog to starting position after shifting of the last rod, latches for holding said rods when released by said dog, and means for returning said rods when said latches are released.

15. A fluting machine comprising projectable and retractable fluting irons, operating rods connected with said irons and slidably mounted for movement on substantially parallel lines, a carriage mounted adjacent said rods for movement parallel therewith, means for moving said carriage, said carriage having a guideway transverse to said rods, a dog carrier movable along said guideway, a spring-moved arm pivoted to said carriage and connected to said dog carrier, to exert a constant stress to move said carrier toward one end of the guideway, a dog on said carrier for successively shifting said rods to iron-projecting position when the carriage is operated, a relatively stationary pivoted arm engaged by said first named pivoted arm when the last rod is shifted, said relatively stationary arm being then active to swing said first named arm and return said dog carrier to starting position, latches for holding said rods when so shifted, and means for returning said rods when their respective latches are released.

16. A structure as specified in claim 15, said first named arm having a lateral projection and said relatively stationary arm having a forked end to receive said projection and operatively engage the two arms.

17. A structure as specified in claim 14; said dog being pivoted for inward swinging and passage across said rods when returning to starting position.

18. A fluting machine comprising projectable and retractable fluting irons, means for projecting said irons for use, and means including a plurality of hand controls for retracting said irons at will.

19. A fluting machine comprising projectable and retractable fluting irons projectable successively for use, spring means for retracting said irons, and means for holding said irons projected against the action of said spring means, including latches and a keyboard for releasing them.

20. A fluting machine comprising projectable and retractable fluting irons, operating rods connected to said irons, means for moving said rods in one direction, manually releasable latch levers for holding certain of said rods against the action of said moving means, and additional latches for the other rods mounted on and releasable by said latch levers.

21. A fluting machine comprising a casing, a heater in said casing, U-shaped tubes whose two reaches are positioned above and below said heater, fluting irons in the upper reaches of said tubes projectable beyond the casing, slidable operating rods in the lower reaches of said tubes, wires in said tubes connecting said irons and rods, springs connected to said rods for moving them in one direction to retract the fluting irons and simultaneously project said irons from the casing, an apron on the casing beneath which said rods are projected, key releasable latches mounted under said apron for holding said rods when the fluting irons are projected, a slidably mounted foot-operated bar below said rods, and a dog on said bar for successively moving said rods to project said irons.

22. A fluting machine comprising a casing, fluting irons in said casing, means for projecting said irons from the casing, an iron heater in said casing, and means for adjusting said heater toward and from said irons.

23. A fluting machine comprising a casing, fluting irons in said casing, means for projecting said irons from the casing, a horizontal partition in said casing below said irons, said partition having vertical openings, a heater between said partition and irons having guide lugs depending slidably into said openings, one of said lugs having a cam surface, and a horizontal screw mounted on said partition and having a tapered end co-operable with said cam surface to vertically adjust said heater.

24. A fluting machine comprising a casing and heating means therein, projectable fluting irons in said casing adapted to be heated by said heating means, a dampered heat outlet from said casing, and thermostatic means for controlling the damper of said outlet.

In testimony whereof we have hereunto set our hands.

RUSSELL T. MURRAY.
JOHN WILEY TASKER.